United States Patent
Mruk et al.

(10) Patent No.: US 8,061,021 B2
(45) Date of Patent: Nov. 22, 2011

(54) METHOD OF REPLACING ELECTRICAL COMPONENTS OF A MONITORING SYSTEM

(75) Inventors: Walter Mruk, Chatham, NJ (US); Martin Adams, Chatham, NJ (US); Robert Barnacle, Chester, NJ (US)

(73) Assignee: DataOnline Intellectual Property, LP, Berkeley Heights, NJ (US)

( * ) Notice: Subject to any disclaimer, the term of this patent is extended or adjusted under 35 U.S.C. 154(b) by 0 days.

(21) Appl. No.: 12/756,227

(22) Filed: Apr. 8, 2010

(65) Prior Publication Data
US 2011/0247189 A1 Oct. 13, 2011

(51) Int. Cl.
*H05K 3/30* (2006.01)

(52) U.S. Cl. .............. 29/832; 29/402.01; 29/402.08; 361/667

(58) Field of Classification Search ........... 29/402.01, 29/42.08, 832, 837, 33 M; 324/156; 340/870.02, 340/531, 693.5, 693.9; 361/667, 657, 659; 439/367, 536, 572
See application file for complete search history.

(56) References Cited

U.S. PATENT DOCUMENTS

| | | | | |
|---|---|---|---|---|
| 2,556,909 A | * | 6/1951 | Feibel et al. | 378/193 |
| 2,702,260 A | * | 2/1955 | Massa | 134/1 |
| 4,713,609 A | * | 12/1987 | Losapio et al. | 324/156 |
| 5,767,790 A | * | 6/1998 | Jovellana | 340/870.02 |
| 6,608,253 B1 | * | 8/2003 | Rintz | 174/66 |
| 7,399,985 B2 | | 7/2008 | Mruk et al. | |
| 7,614,242 B1 | * | 11/2009 | Saborio | 62/77 |
| 2004/0246143 A1 | * | 12/2004 | Crichlow | 340/870.02 |
| 2007/0159326 A1 | * | 7/2007 | Quist et al. | 340/539.26 |
| 2009/0153357 A1 | * | 6/2009 | Bushman et al. | 340/870.02 |

* cited by examiner

*Primary Examiner* — A. Dexter Tugbang
*Assistant Examiner* — Jeffrey T Carley

(57) ABSTRACT

The method of replacing the electrical components of a monitoring system. The method includes attaching a housing that contains a battery, sensor and other electronic components to a container. Next, a first lid that contains electronic components that are electrically connected to the sensor in the housing via an electronic cable is removed by detaching the electric cable from the electronic components of the lid. A second lid is then provided wherein the electric cable is electrically connected to the second lid at which point in time the second lid is secured to the housing to complete the replacement.

7 Claims, 2 Drawing Sheets

METHOD OF REPLACING ELECTRICAL COMPONENTS OF A MONITORING SYSTEM

BACKGROUND OF THE INVENTION

This invention relates to monitoring systems for measuring materials in a container. More specifically, this application relates to the replacing of electrical components of a monitoring system.

Monitoring or detection systems for determining the material level in a container are well known in the art. For example, U.S. Patent Publication No. 2008/0011970 to Mruk teaches such a detection system and is incorporated in full herein. While such systems are sufficient at determining material level in a container, problems exists changing out communication cards and electronic components when such need to be replaced, updated, or changed based upon use with a particular communication system. Thus, a need exists for an improved system that facilitates replacement of parts of such systems.

Therefore, a principal object of the present invention is to facilitate the replacing of electrical components of a monitoring system. These and other objects, features and advantages will become apparent from the specification and claims.

BRIEF SUMMARY OF THE INVENTION

A method of replacing electrical components of a monitoring system. The method includes attaching a housing containing a battery and a sensor to a container. The housing has a first lid that is secured thereto that has electrical components electrically connected the sensor in the housing via an electric cable. Next, the first lid is removed from the housing and the electric cable is detached from the electrical components. The electric cable is then connected to the electrical components of a second lid and the second lid is secured to the housing accordingly.

DETAILED DESCRIPTION OF THE PREFERRED EMBODIMENT

Figure 1:
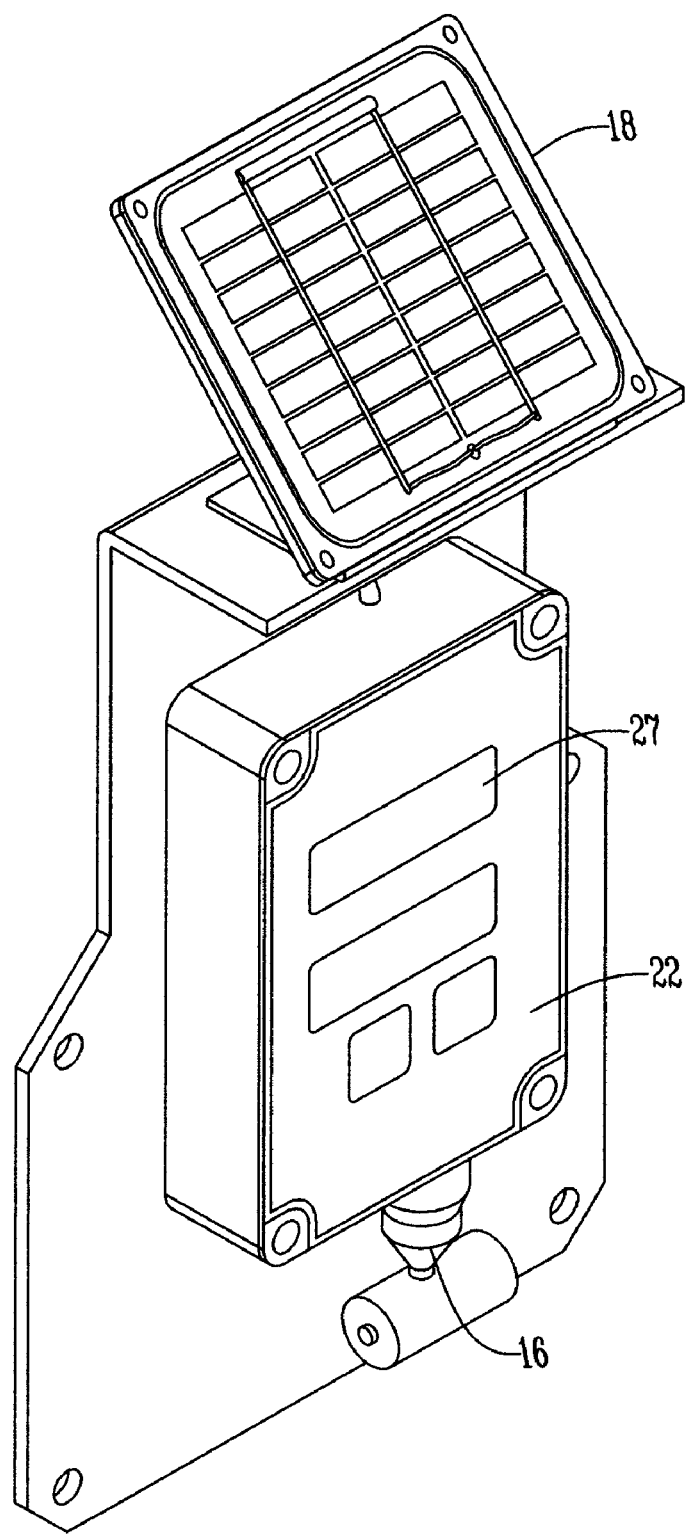
FIG. 1 is a perspective view of a monitoring system.
Figure 2:
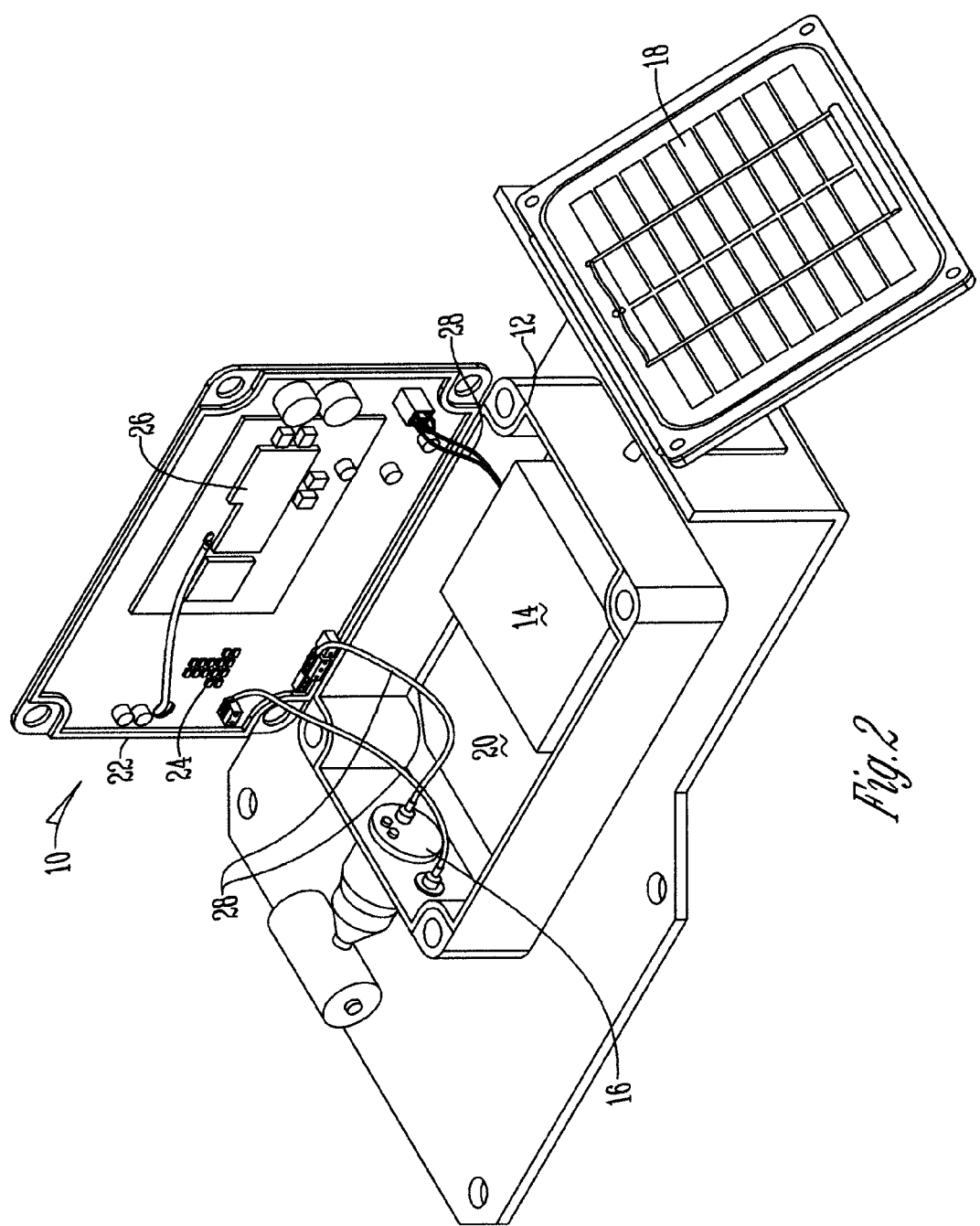
FIG. 2 is a perspective view of an open monitoring system.

The Figures show a monitoring system 10 and method of replacing components of the same. The system 10 has a housing 12 that in a preferred embodiment is made of a polycarbonate material. Disposed within the housing 12 are a battery 14, sensor 16, an electrical connection to a solar panel 18 and other electronic components 20 that are electrically connected to one another to provide detecting the monitoring of a container (not shown). Detachably secured to the housing 12 is a lid 22 that contains electronic components 24 and a communication card 26 are operated by the battery 14, sensor 16, solar panel 18 and other electronic components 20 within the housing. On an opposite side the lid 22 further has a screen 27 that provides a digital display. A detachable electronic cable 28 connects the electronic components 20 within the housing 12 with the electronic components 24 contained on the lid 22 such that an electrical connection is provided and the lid 22 may be secured to the housing 12 for operation.

When a communication card or electronic components 24 need to be replaced a first lid 22 is removed from the housing 12. At that point in time the electronic cables 28 are removed from the electronic components 24 of the lid 22 and the lid, including the electronic components 24 and communication card 26, can be taken for repair or analysis. Then, a second lid 22 containing electronic components 24 and a communication card 26 can be attached to the electronic cable 28 to provide an electrical connection between the electric components 20 within the housing 12 and the electrical components 24 of the second lid 22. At this point in time the second lid 22 is secured to the housing 12.

Thus, provided is an improved monitoring system that facilitates the replacement of electronic components 24 and communication card 26. By having a two-piece system connected by cables 28 the lid 22 having the system is easily replaced. Thus, an individual can unclip first lid 22 and put in a second lid 22 in seconds for easy installation and replacement. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A method of replacing electrical components of a monitoring system steps comprising:
   providing a housing containing a power source and a sensor;
   said housing having a first lid secured thereto wherein the first lid has electronic components within the lid and electrically connected to the sensor in the housing via an electric cable;
   removing the first lid from the housing and detaching the electric cable from the electronic components of the first lid;
   connecting the electric cable to electronic components of a second lid; and
   securing the second lid to the housing.

2. The method of claim 1 wherein the housing is made of a polycarbonate material.

3. The method of claim 1 wherein the first lid has a communication card electrically connected to the electronic components.

4. The method of claim 1 wherein the housing contains a solar panel.

5. The method of claim 1 wherein the first lid has a screen opposite the electronic components.

6. The method of claim 1 additionally comprising electronic components disposed within the housing.

7. The method of claim 6 wherein a detachable electronic cable connects the electronic components disposed within the housing to the electronic components of the first lid.

* * * * *